H. L. EASTMAN AND F. B. RAE.
CALCULATING DEVICE.
APPLICATION FILED JULY 21, 1916.
1,378,666.
Patented May 17, 1921.
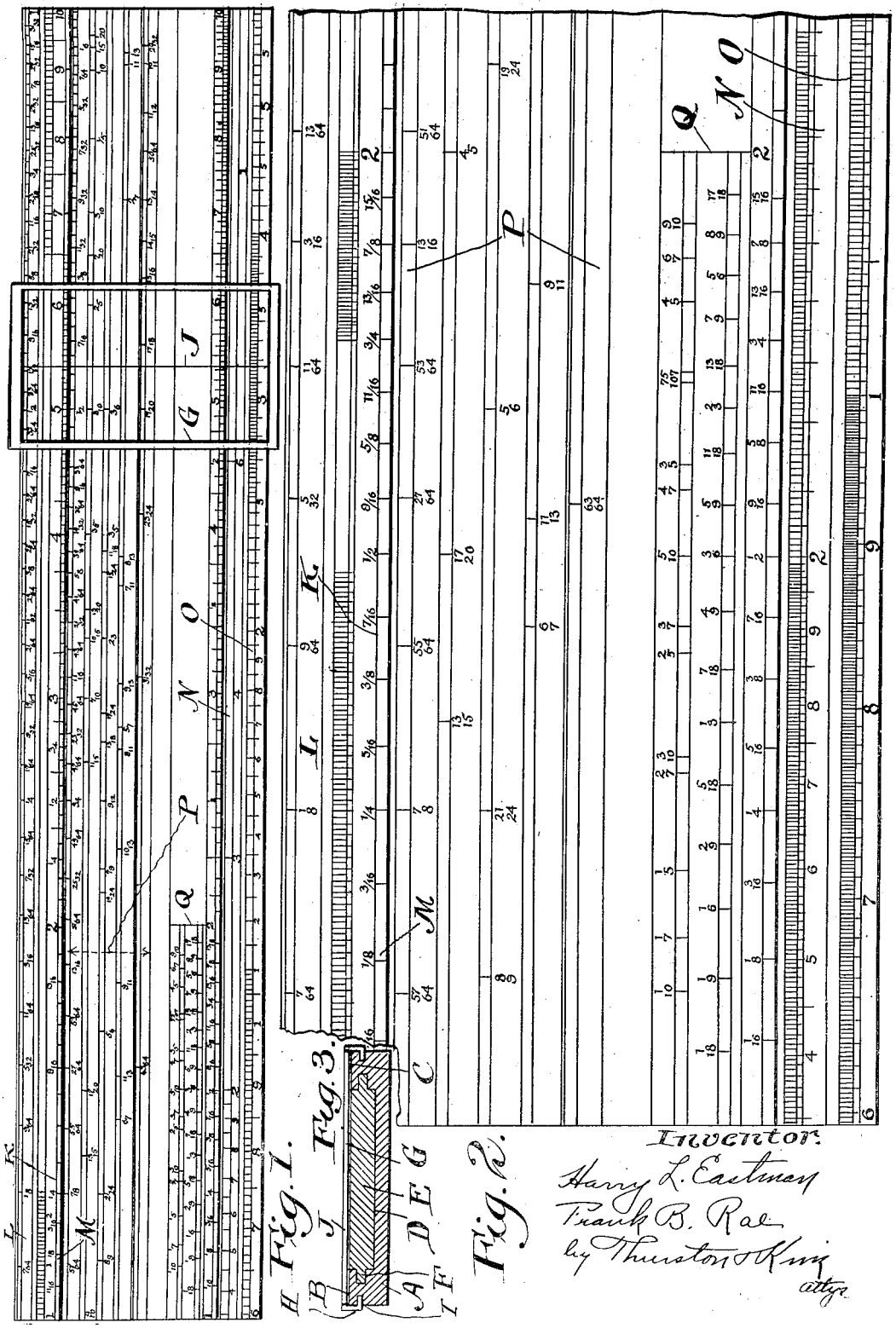

UNITED STATES PATENT OFFICE.

HARRY L. EASTMAN AND FRANK B. RAE, OF CLEVELAND, OHIO, ASSIGNORS, BY DIRECT AND MESNE ASSIGNMENTS, OF FOUR-TENTHS TO SAID RAE AND SIX-TENTHS TO SAID EASTMAN.

CALCULATING DEVICE.

1,378,666.     Specification of Letters Patent.     Patented May 17, 1921.

Application filed July 21, 1916. Serial No. 110,484.

*To all whom it may concern:*

Be it known that we, HARRY L. EASTMAN and FRANK B. RAE, citizens of the United States, and residents of Cleveland, in the county of Cuyahoga and State of Ohio, have invented a certain new and useful Improvement in Calculating Devices, of which the following is a full, clear, and exact description.

This invention relates to a calculating device by which problems of certain character may be directly solved, obviating mental calculations.

The device is applicable to finding the length of a line of known value where it is desired to enlarge or diminish the line in a given ratio.

More particularly the device is intended for use by engravers, printers and make-up men in calculating enlargements or reductions of sizes of engravings, set-ups of printed matter, etc. However, the device of the invention is not confined to such trade uses.

Further in this connection a scale is provided by which when a new dimension is found, the ems of type such as pica or agate type which will go in a line the length of which has been calculated, may be directly found.

Generally speaking, the invention may be said to comprise the elements and combinations thereof set forth in the accompanying claims.

Reference should be had to the accompanying drawings forming a part of this specification in which Figure 1 is a top plan view of one embodiment of our invention; Fig. 2 is a top plan view of a portion of the device shown in Fig. 1 on an enlarged scale; Fig. 3 is a cross sectional view of the embodiment of our invention shown in Fig. 1.

Broadly speaking, the invention comprises certain fixed scales and certain scales which in a physical embodiment of the invention will be so related to the fixed scales that they may be moved with respect thereto for the purpose of solving problems.

In the particular embodiment of the invention around which the disclosure and description of the invention will be made, we have adopted a slide rule construction.

In this embodiment, there is a body portion A which has face portion B and C and between the face portions there is a depressed part D in which there is mounted a slide E. This slide is provided with extensions F which extend into grooves formed in the base A, so that the portion E may slide with respect to the portion A.

The slide E is so fashioned that the top face will lie substantially flush with the face B and C.

Extending across the face portion B and C and the top or face of the slide is a frame G. This frame has extensions at the ends thereof indicated at H, which extensions are formed so as to engage with grooves indicated at I formed in the sides of the body A. This frame G may therefore slide along on top of the face B and C and the slide E. The frame is provided with a hair line J as indicated in Fig. 1.

So much of the construction described is essentially ordinary construction in slide rules.

Upon the face B there is a scale K. This scale is the usual slide rule logarithimc scale which is well known and needs no further description. Above the scale K is a scale L and below the scale K is a scale M. These scales L and M represent the common fractional values of the decimal divisions of the scale K, that is to say, if in solving a problem with the device of this invention, the answer to the problem is less than unity, that is to say, is a decimal, or if the answer to the problem is represented by the whole number and an additional value less than unity, then the equivalent common fraction of the decimal portion of the answer may be read upon the scale L or M. It may be that the exact value of the decimal may not be given on the scale L or M, but the nearest fraction will be given.

The lower scale N is a scale which is graduated properly with respect to the scale K and indicates the number of ems of agate type which may be set in a line, the length of which is determined upon the scale K. For example, in a line which is 5 and 17/32 inches long, as indicated on the scale K, there will be 53 ems of agate type.

The scale represented at O indicates the number of ems of pica type that may be set up in a line the length of which corresponds with the length as found on the scale K. Obviously other scales, properly graduated to indicate other kinds of type, may be provided.

Referring to Fig. 1 and the scale K, it will be seen that in the line 5 and 17/32 inches long, there will be 31 ems of pica type.

It will thus be seen that the scales N and O are merely linear scales indicating the number of agate and pica type which may be set up in a line of given length, but these scales are so proportioned as to correspond with the scale K.

Upon the upper part of the slide E there is a scale which is indicated at P. This is really a series of scales and it will be seen that the scale starts from the right-hand side of the drawing in Fig. 1, that is to say, from the opposite end of the scale to that at which the scale K starts. This scale while shown in a multiplicity of lines is really all one scale and the marks on the drawings indicate various fractions which progress from 1/64 up to 63/64. The various numbers indicated on this scale are chosen because they seem to represent practially all the fractional reductions which might be called for in using the scale. However, it will be apparent that fractions, in addition to those indicated, might be placed upon this scale.

This scale P is used when it is desired to solve a problem in which problem it is required to find the length of a line which is reduced by a given ratio, that is to say, it may be desired to find the length of a line which is reduced 7/16 or 5/8, or in a ratio represented by any one of the fractions by this scale.

In solving such a problem, the known length of the line is found upon the scale K and the slide is moved until the line at the end of the slide coincides with the graduation on the scale K which represents the length of the known line. Then the frame G is moved until the hair line carried by the frame G coincides with the graduation representing the fraction which is the ratio in which it is desired to reduce the length of the line. This hair line of the frame G being placed, the length of the line when reduced by the ratio desired may be read upon the scale K beneath the hair line of the frame G and as before explained, the scale L or the scale M will indicate the nearest common fraction to the decimal reading which may be given by the scale K.

Of course, in making a determination of this kind, the placing of the decimal point in reading the scale K must be determined but this, of course, is readily determinable by one's general knowledge of the approximate answer, that is to say, if the length of the original line was 6 and it was desired to find the length of a line which was reduced 2/3, the manipulation of the device as just described would give the answer 2 on the scale K; that this answer 2 represented a whole number would be known by the very nature of the problem. On the other hand, if it were desired to find the length of a line the length of which was originally 6 by reducing the same 31/32, while the scale K would indicate the figures 1875, it would be apparent that the decimal point should be placed in front of the figure 1 and that the length of the line thus obtained was less than one inch long.

The scale Q while showing a series of lines is in reality one scale which starts at 1/10 and ends at 17/18 for enlargements which are less than a unitary enlargement while the remainder of the scale Q extends across the slide and ends with 10. It will be seen that the numbering on this scale starts at the end of the device which is at the end opposite to the end at which the scale P starts. This scale Q is used in calculating enlargements.

In using this scale, to determine what would be the length of a line of known length, if enlarged or lengthened by a given ratio, the slide E is moved until the end line thereon comes into registry with the graduation upon the scale K which represents the length of the known line. Then the frame G is moved until the hair line thereon coincides with the graduation upon the scale Q which represents either the fraction or the whole number by which it is desired to enlarge or lengthen the line. With the frame G in this position, the new length of the line will be found by reading the graduation under the hair line upon the scale K.

With this scale as with the scale P, the decimal point will be determined by the user of the device.

As stated with respect to the scale P, the scale Q may be arranged to any desired ratio of enlargements.

It will be apparent that our invention may be emobdied in other forms than that of the slide rule which is herein described. It is a well known fact that the usual and ordinary computing slide rule with which engineers are familiar, is embodied in diverse forms which, however, function so far as calculating is concerned in some manner and so with our invention, any form of calculating device which in operation utilizes the principle of the usual slide rule may be adapted to our device and we consider such within the province of our invention.

Having thus described our invention, we claim :—

1. A scale for calculating fractional reductions of a linear dimension which comprises two logarithmic scales that are so mounted as to be relatively movable, one of the scales representing linear lengths, the other scale designating fractions indicating a proportion of reduction, the last mentioned scale arranged so that its progression is in a direction opposite to the direction of progression of the first mentioned scale.

2. A scale for calculating fractional reductions and multiple enlargements of a linear dimension which comprises two logarithmic scales which are relatively movable, one of the scales representing linear lengths, the other scale designating fractions indicating a proportion of reduction, the last mentioned scale arranged so that its progression is in a direction opposite to the direction of progression of the first mentioned scale, and a third logarithmic scale movable with respect to the first mentioned scale having graduations which progress in the same direction as the graduation of the first scale, the graduations of said third scale representing multiple enlargements of a linear dimension.

3. A calculating device for the use of printers, etc., comprising a graduated logarithmic scale, a graduated reducing scale and a graduated enlarging scale both of which last mentioned scales may be moved with respect to the logarithmic scale, the graduations of the enlarging scale having a progression which corresponds with the progression of the logarithmic scale, and a scale which is fixed relative to the logarithmic scale, the graduations of the reducing scale having a progression similar to the logarithmic scale but in opposite direction, said last mentioned scale having graduations arranged in a progression which corresponds with the progression of the logarithmic scale, the said last mentioned scale being adapted to indicate the number of ems of agate or pica type which could be set up in a line of a length which would correspond with an indicated length of line upon the logarithmic scale.

4. A calculating device for use of printers, etc., comprising a base member having a graduated logarithmic scale arranged thereon and also having a graduated type scale, the graduations of the type scale having a progression similar to the graduations of the logarithmic scale, said type scale indicating the number of ems of type which could be set up in a line of the length indicated by the various graduations of the logarithmic scale, a slide coöperating with the base, said slide having a graduated reducing scale thereon and a graduated enlargement scale thereon, the graduations of the enlarging scale having a progression which corresponds with the progression of the logarithmic scale, the graduations of the reducing scale having progression similar to the logarithmic scale but in opposite direction, the designations of its graduations progress reversely with respect to the graduations of the logarithmic scale, for the purpose described.

In testimony whereof, we hereunto affix our signatures.

HARRY L. EASTMAN.
FRANK B. RAE.